United States Patent
Baldeschwieler

[15] 3,677,642
[45] July 18, 1972

[54] ION CYCLOTRON RESONANCE STIMULATED GLOW-DISCHARGE METHOD AND APPARATUS FOR SPECTRAL ANALYSIS

[72] Inventor: John D. Baldeschwieler, Menlo Park, Calif.

[73] Assignee: Varian Associates, Palo Alto, Calif.

[22] Filed: Aug. 4, 1967

[21] Appl. No.: 658,366

[52] U.S. Cl.................................356/85, 331/94.5
[51] Int. Cl........................................G01j 3/30
[58] Field of Search.............250/41.9 IE, 41.9 G, 41.9 Z; 356/72, 73, 85, 86; 331/94.5

[56] References Cited

UNITED STATES PATENTS

| | | | |
|---|---|---|---|
| 2,632,112 | 3/1953 | Washburn et al. | 250/41.9 Z |
| 2,670,649 | 3/1954 | Robinson | 356/85 |
| 2,708,387 | 5/1955 | Broida et al. | 356/85 |
| 3,277,396 | 10/1966 | Statz | 331/94.5 X |

OTHER PUBLICATIONS

The Journal of Chemical Physics; Vol. 28, No. 1, Hurzeller et al., Jan. 1958, pp. 76 to 82.

*Primary Examiner*—William F. Lindquist
*Assistant Examiner*—A. L. Birch
*Attorney*—William J. Nolan and Leon F. Herbert

[57] ABSTRACT

Ion cyclotron resonance stimulated glow-discharge devices are disclosed. In these devices an ensemble of gaseous material comprising at least two different gaseous constituents is ionized to produce ions of at least one of the gaseous constituents. A radio-frequency field at the cyclotron resonance frequency of the ionized gaseous constituent is applied to the gas for exciting cyclotron resonance of the ionized constituent in a magnetic field. The cyclotron resonant ion absorbs energy from the applied radio-frequency field substantially increasing its translational velocity. The cyclotron resonant ion is chemically interacted as by an exchange collision with the second gaseous constituent of the gas sample to produce a gaseous product having an excited electronic energy state. The excited electronic energy state decays by the emission of photons of optical radiation which are extracted from the ensemble of gas for use.

5 Claims, 3 Drawing Figures

INVENTOR.
JOHN D. BALDESCHWIELER
BY
ATTORNEY

INVENTOR.
JOHN D. BALDESCHWIELER
BY
ATTORNEY

ION CYCLOTRON RESONANCE STIMULATED GLOW-DISCHARGE METHOD AND APPARATUS FOR SPECTRAL ANALYSIS

In an ion cyclotron mass spectrometer employing features of the present invention, the emitted light is passed through a grating or prism spectrophotometer for separating the emitted light according to wavelength. The separated light is then detected by a photocell to obtain an optical spectrum representative of the excited electronic states of the gaseous product. This spectrum is useful for analysis of the electronic states of the gaseous product, for determining certain vibrational and rotational constants of the gaseous product, for determining bond strength, for determining the structure of the gaseous product, and for analysis of the symmetry of the atomic structure of the gaseous product. In a preferred embodiment, the radio frequency energy applied for producing cyclotron resonance of the ions is modulated at an audio frequency to produce an audio modulation in the intensity of the emitted light. A phase sensitive detector is then employed for comparing the phase of the audio modulation signal with the phase of the modulation component on the detected light to derive an output signal which precisely defines the light emanating from the reaction to be monitored while excluding detection of light originating from other mechanisms inside of the gaseous ensemble.

In another embodiment of the present invention, the optical radiation emitted from the gaseous ensemble is reflected to and fro through the gaseous ensemble by means of an optical resonator tuned to the frequency of the optical radiation to produce coherent emission of radiation from the gaseous ensemble. A portion of the coherent optical radiation is extracted from the optical resonator to form a laser beam. In one embodiment of the laser of the present invention, gaseous constituents are selected which include an isotope which is to be excited to the elevated electronic energy state from which photons are emitted. In this manner selection of different isotopes permits generation of laser beams which are extremely close in optical wavelength.

DESCRIPTION OF THE PRIOR ART

Heretofore, ion cyclotron resonance mass spectrometers have been built which subjected an ionized gaseous sample to radio-frequency energy at the cyclotron resonance frequency of one of the ionized gaseous constituents. However, in these prior devices, no attempt was made to examine or to utilize the optical radiation emitted from the gaseous material, if such optical radiation was in fact produced. A typical example of such a prior ion cyclotron mass spectrometer is described and claimed in co-pending U. S. application Ser. No. 658,365 filed Aug. 4, 1967 and assigned to the same assignee as the present invention.

SUMMARY OF THE PRESENT INVENTION

The principal object of the present invention is the provision of an improved ion cyclotron resonance stimulated glow discharge method and apparatus.

One feature of the present invention is the provision, in an ion cyclotron resonance apparatus, of applying radio-frequency energy to an ionized gaseous constituent at the cyclotron resonance frequency thereof to excite cyclotron resonance of the ionized constituent for stimulating a reaction of that constituent with a second constituent to produce an electronically excited gaseous product. The excited state of the product decays to a lower electronic state by emission of photons of optical radiation. The optical radiation is extracted from the ensemble of gaseous material for use, whereby optical radiation can be selectively produced from one gaseous constituent without exciting optical radiation from all the gaseous constituents of the gaseous ensemble.

Another feature of the present invention is the same as the preceding feature, wherein the radio frequency energy is modulated at a certain modulation frequency to produce a modulation at a related frequency in the optical radiation emitted from the excited gaseous product, whereby the optical radiation emanating from the certain predetermined gaseous product may be more readily identified by the modulation component superimposed thereon.

Another feature of the present invention is the same as any one or more of the preceding features wherein the optical radiation emanating from the gaseous product is analyzed to separate the optical components thereof according to wavelength and means for detecting the optical radiation according to wavelength, whereby an optical spectrum of the excited gaseous product is obtained to facilitate analysis of the gaseous product and the reactions involving same.

Another feature of the present invention is the same as any one or more of the preceding features including a phase-sensitive detector for comparing the phase of audio modulation applied to the radio frequency energy with audio modulation, if any, present in the optical radiation emanating from the gaseous ensemble to facilitate identification and detection of certain gaseous products of the desired reaction.

Another feature of the present invention is the same as the first feature including the provision of an optical resonator coupled to the optical radiation emitted from the excited gaseous product for reflecting the emitted optical radiation to and fro through the excited gaseous product to obtain coherent emission of optical radiation therefrom, whereby a laser beam output is obtained.

Other features and advantages of the present invention will become apparent upon a perusal of the following specification taken in connection with the accompanying drawings wherein:

DESCRIPTION OF THE PREFERRED EMBODIMENTS

Figure 1:
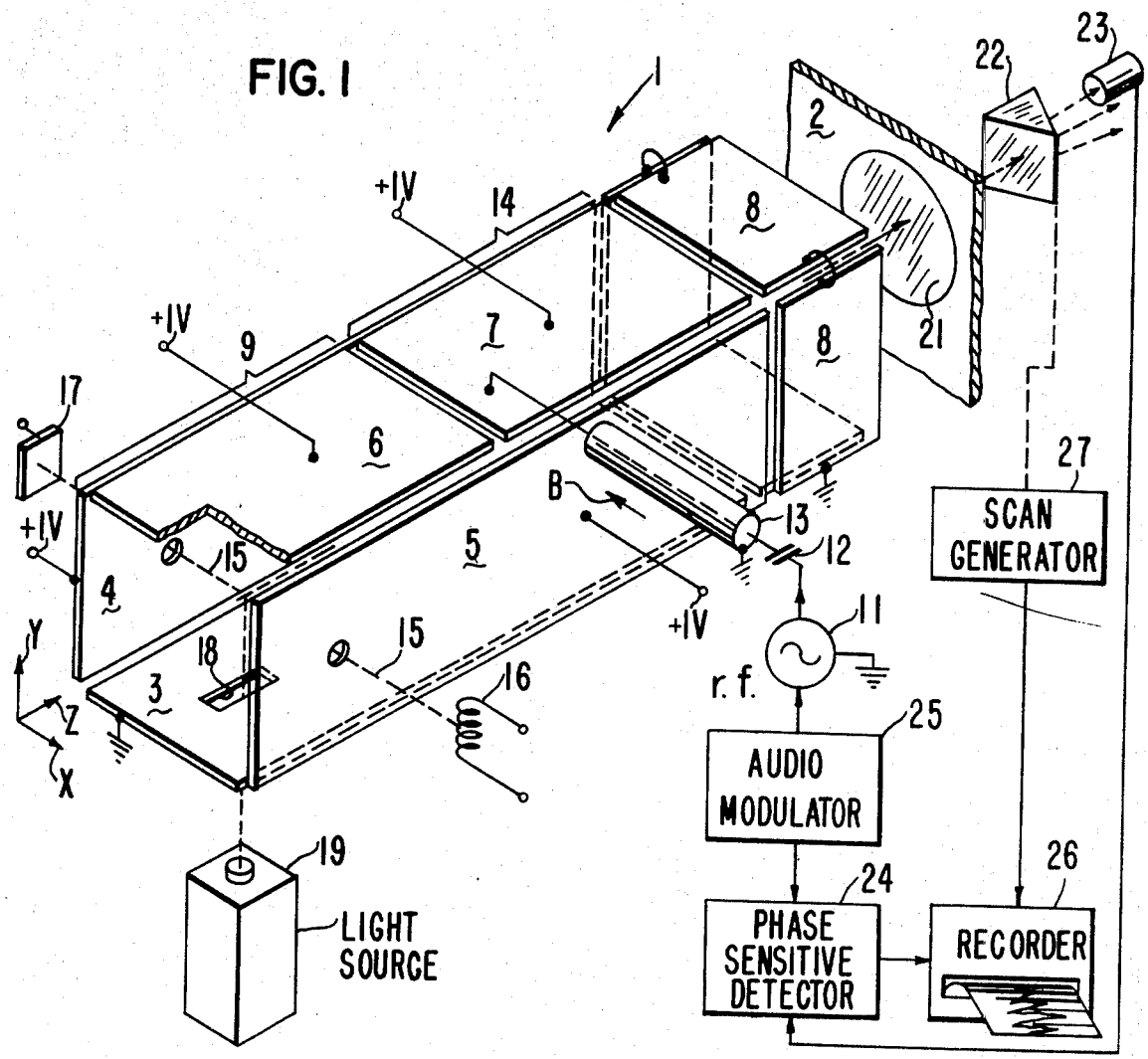
FIG. 1 is a perspective schematic diagram of an ion cyclotron resonance mass spectrometer apparatus employing features of the present invention.

Referring now to FIG. 1, there is shown an ion cyclotron resonance mass spectrometer employing features of the present invention. The spectrometer includes an electrode structure 1 disposed within a hollow vacuum envelope structure 2, only partially shown in this figure, evacuated to a suitably low pressure as of, for example, $10^{-3}$ to $10^{-5}$ Torr. The electrode structure 1 is generally of a hollow box-like shape, having open ends. More specifically, the electrode structure 1 includes a bottom base plate 3 with a pair of elongated sideplates 4 and 5 and a top plate structure formed by a first plate 6 and a second plate 7 which are slightly axially spaced along the axis of the electrode structure 1. The bottom plate 3 is grounded for r.f. and d.c. potentials, whereas the top plates 6 and 7 and the side plates 4 and 5 are operated at a small positive bias relative to the base plate, as of +1 volt. A four-sided open-ended electrode structure 8 is disposed at the end of the electrode structure 1 and the plates of this electrode structure are all connected together and grounded for d.c. and r.f. potentials.

The composite electrode structure 1 includes a first section defined by the axial extent of the top plate 6 and forming the ion source region 9 of the electrode structure 1. The top plate 7 is connected to a radio frequency generator 11 via a coupling capacitor 12 and a shielded coaxial line 13 to define an analyzer region 14 of the electrode structure 1. The radio frequency potential applied to the top plate 7 produces a radio frequency electric field within the electrode structure 1 parallel to the $y$ direction and perpendicular to a magnetic field B, directed potential applied to the top plate along the $x$ axis and in which the electrode structure is immersed.

In the source region 9, the side plates 4 and 5 are apertured to permit passage of an electron beam 15 through the source region 9 from a filamentary emitter 16 to a beam collector electrode 17. The electron beam 15 serves to ionize gaseous constituents within the source region 9 by electron bombardment. Alternatively, the base plate 3 may be apertured at 18 to permit passage of an ionizing light beam, such as ultra violet light, into the source region 9 from a light source 19 disposed on the y axis.

Positive ions produced within the source region 9 come under the influence of the static electric fields produced by the potential supplied to the side plates 4 and 5 and the top plates 6 and 7 causing the positive ions to be confined to a central region of the composite electrode structure and to execute cycloidal trajectories with a mean direction along the z axis of the electrode structure. When the ions reach the field free region of the ion collector electrode structure 8, they travel to the side walls of the electrode structure and are collected.

In the analyzer region 14, ion cyclotron resonance of certain ions is excited by applying a radio frequency potential between top plate 7 and base plate 3 at the cyclotron resonance frequency of the ion to be resonated. The cyclotron resonance frequency $\omega_c$ is defined as $$\omega_c = zeB/m \qquad 1.$$

where $z$ is the number of charges per ion, $e$ is the charge of an electron, $B$ is the magnetic field strength, and $m$ is the mass of the ion. Typically, the cyclotron resonance frequency for relatively low mass ions falls within the frequency range of 100 to 300 KHz.

In certain ionic reactions, to be more fully described below, optical radiation is emitted from the analyzer region 14. It is desired to utilize this optical radiation and therefore an optically transparent window 21 is placed in the vacuum envelope 2 in axial alignment with the z axis of the electrode structure 1. A grating or prism spectrophotometer 22 is positioned on the z axis of the electrode structure to receive and analyze the optical radiation emitted from the analyzer region 14. A typical example of a suitable spectrophotometer is a Jerrell Ash one-half meter grating spectrophotometer. The spectrophotometer separates the optical radiation input according to its wavelength and a photocell 23 detects the optical radiation as separated by the spectrophotometer. The output of the photocell 23 is fed to one input of a phase-sensitive detector 24 for comparison with an audio modulation signal derived from an audio modulator 25 which is employed to modulate the intensity of the radio frequency generator 11 at a suitable audio frequency, for example, 50 Hz.

In certain reactions, more fully described below, the ion cyclotron resonance in the analyzer region 14 serves to stimulate a reaction resulting in the emission of the optical radiation to be analyzed. Therefore, modulation of the intensity of the radio frequency generator 11 serves to modulate the intensity of the optical radiation resulting from the reaction which is stimulated by the radio frequency energy. This audio modulation component on the optical radiation is picked up in detector 23 and compared with the phase of the modulation signal in the detector 24 to produce a d.c. or low frequency output signal which is fed to a recorder 26 for recording as a function of a scan signal derived from scan generator 27. The scan generator serves to scan the spectrophotometer 22 through the various optical lines of the optical radiation emitted from the discharge. The output of recorder 26 is therefore an optical spectrum of the optical radiation emitted from the excited gaseous constituent or product. Such an optical spectrum is useful for analyzing the electronic states of the gaseous product, for analyzing the vibrational and rotational constants of the gaseous product, for determining bond strengths, for determining structure of the emitting gas, and for determining symmetry of the atom or molecule which is emitting the optical radiation.

Figure 2:
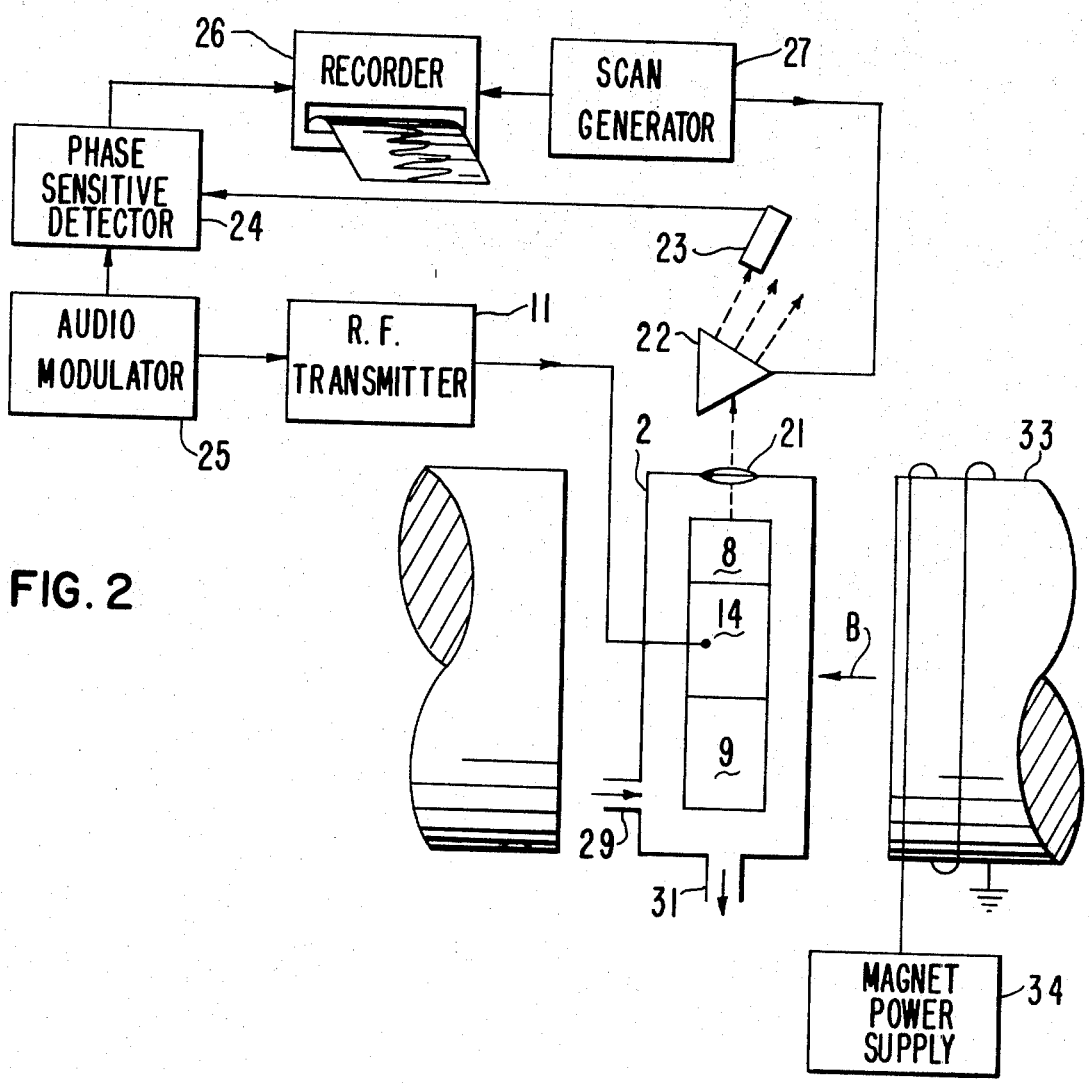
FIG. 2 is a schematic block diagram of an ion cyclotron resonance mass spectrometer employing the structure of FIG. 1.

Referring now to FIG. 2, it will be described how the apparatus of FIG. 1, is employed for analyzing certain gaseous reactions. The sample of gas to be analyzed is fed into the vacuum envelope structure 2 via inlet port 29. The gas to be analyzed may comprise two or more gaseous constituents or may comprise one gaseous constituent which when subjected to radiation by heat, light, or radio frequency energy dissociates into two different gaseous constituents. The vacuum envelope 2 is continuously evacuated by a vacuum pump, not shown, connected to the envelope via exhaust tubulation 31. By way of an example, assume that a reaction involving nitrogen and carbon monoxide of the following general form is to be analyzed by obtaining an optical spectrum of the optical emission radiated from the excited carbon monoxide ion:

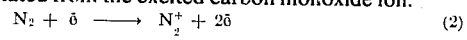  (2)

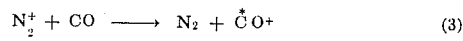  (3)

In the first reaction the $N_2$ and CO are subjected to electron impact by the ionizing beam of electrons 15. In this reaction, the $N_2$ is ionized. The nitrogen ions pass from the ion source region 9 into the analyzer region 14 wherein they are subjected to radio frequency energy at the ion cyclotron resonance frequency $\omega_c$ of the nitrogen ions. The r.f. energy is obtained from the radio frequency transmitter 11 which may be, for example, at a fixed frequency with the magnetic field B produced by an electromagnet 33 and adjusted for the proper intensity by a magnet power supply 34 to satisfy the cyclotron resonance condition at the fixed radio frequency of 300 KHz.

At ion cyclotron resonance, the $N^+_2$ ions absorb energy from the radio frequency field and the translational velocity of the $N_2$ ions is substantially increased. A resonant nitrogen ion, upon collision with a carbon monoxide molecule, produces reaction products consisting of a neutral nitrogen molecule plus a carbon monoxide ion having an excited electronic energy state, indicated by the asterisk in the above formula.

As used herein, the term "reaction" is broadly defined to include not only chemical reactions but exchange collisions wherein charges are transferred from one gaseous constituent to another to produce a resultant product having different charges or electronic energy states. The "reaction" need not change the structure of the molecules.

The electronically excited carbon monoxide ion decays to an unexcited carbon monoxide ion by the emission of optical photons within the visible wavelengths from 3,000 to 5,000 A. The optical radiation, emitted from the excited carbon monoxide ion, is passed through the optically transparent window 21 to the spectrophotometer 22 wherein the radiation is separated according to its wavelengths. The separated light is detected by detector 23 and a signal is fed from the detector 23 to one input of the phase sensitive detector 24 wherein it is compared with a sample of the audio modulation frequency derived from audio modulator 25 to produce the optical spectrum output which is recorded by recorder 26 as a function of the scan of the spectrophotometer, as previously described.

Figure 3:
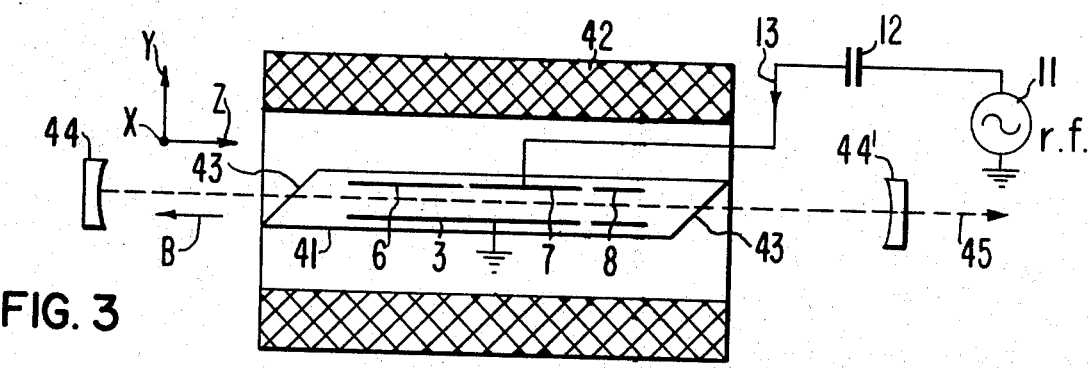
FIG. 3 is a schematic line diagram of a laser employing features of the present invention.

Referring now to FIG. 3, there is shown a laser incorporating features of the present invention. A hollow cylindrical dielectric envelope structure 41 as of alumina ceramic is axially aligned within the central bore of an electrical solenoid 42 for producing a relatively intense axial magnetic field B along the z axis and along the axis of the cylindrical envelope 41. The ends of the envelope 41 are closed off by a pair of Brewster angle optical windows 43. A suitable gas fill, more fully described below, fills the envelope 41 and may either be sealed off or provided with inlet and outlet conduits in communication with a vacuum pump and a source of gas for continuously flowing gas through the envelope 41.

An electrode structure is disposed within the envelope 41 in axial alignment with the z axis. The electrode structure includes a pair of top plates 6 and 7 and a bottom plate 3 but in this case the top plate 7, which is to receive the radio frequency potential, has a much longer axial extent than that indicated in FIG. 1. Within the source region 9, one of the gaseous constituents of the gas fill is ionized by an electron beam. This ion product is excited into cyclotron resonance by the radio frequency energy applied between the top and bottom plates, 7 and 3 respectively, for increasing the translational velocity of the resonant ions and to produce a reaction with another gaseous reactant resulting in an electronically excited gaseous product. The gaseous product decays to a lower energy state by emitting photons of optical radiation.

The photons of optical radiation pass out both ends of the envelope 41 through Brewster angle windows 43 to a pair of mirrors 44 disposed on the z axis of the device. The mirrors 44 are positioned a certain distance apart, corresponding to an integral number of half wavelengths of the optical radiation, to reflect the optical radiation to and fro through the optically emitting gaseous product. The optical radiation reflected between the mirrors 44 interacts on the emitting gaseous product to produce coherent emission of radiation at the optical wavelength of the optical cavity defined by the mirrors 44. A portion of the optical radiation is passed through mirror 44' to form the output light beam 45 of the laser. Beam 45 may be used in any of the well known applications for laser beams. The radio frequency energy is applied to the electrode 7 from a radio frequency transmitter 11 as coupled to the plate 7 by a coupling capacitor 12 and transmission line 13.

Although an electron beam has been described for ionizing the gas in the laser, other suitable sources of ionizing radiation may be employed such as sources of alpha particles or ultra violet light.

Any one of a number of suitable reactions of the general form as shown below may be utilized for the laser of FIG. 3:

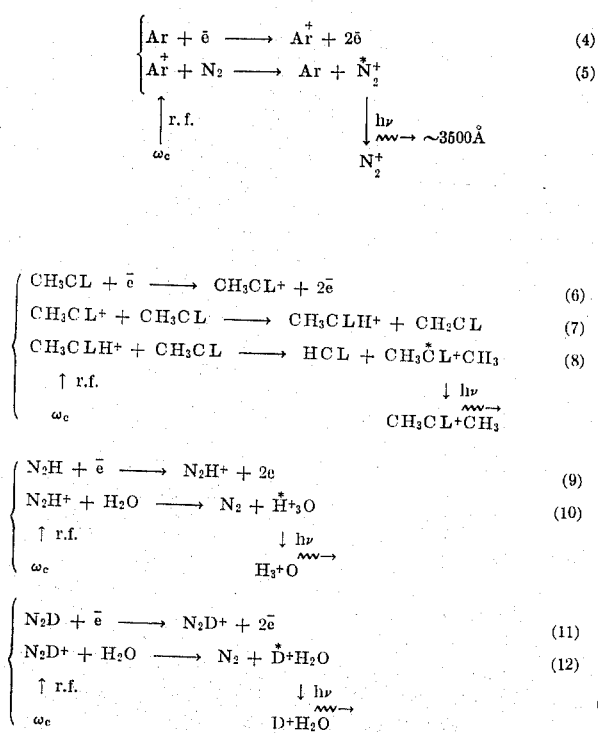

With regard to the above cyclotron resonance stimulated gaseous reactions, note should be taken of the special form of the reactions of equations 9–12. More specifically, these reactions are of the general type as follows:

$$RH^+ + R' \longrightarrow R + R'\overset{*}{H}{}^+ \qquad (13)$$

$$RD^+ + R' \longrightarrow R + R'\overset{*}{D}{}^+ \qquad (14)$$

The reactions of equations 13 and 14 are substantially identical with the exception that the electronically excited gaseous reaction product in equation 13 involves the photon ion and in equation 14 involves an excited deuterium ion. Thus, a laser using the reaction of equation 13 would have output optical radiation of a wavelength very close in wavelength to the output of a laser constructed to utilize the reaction of equation 14. In certain applications, it may be desirable to have two laser beams which have nearly the same wavelength. Such lasers may be constructed utilizing reactions of the type exemplified by equations 13 and 14.

Since many changes could be made in the above construction and many apparently widely different embodiments could be constructed without departing from the scope thereof it is intended that all matter contained in the above description or shown in the accompanying drawings shall be interpreted as illustrative and not in a limiting sense.

What is claimed is:

1. In a gaseous glow discharge apparatus, means for immersing an ensemble of gaseous material in a magnetic field, means for ionizing at least some of the gaseous material, The Improvement Comprising, means for applying radio frequency energy to the ionized gaseous material at the cycletron resonance frequency of a first ionized gaseous constituent in the magnetic field to excite cyclotron resonance of the first ionized gaseous constituent and for stimulating a reaction of said first constituent with a second gaseous constituent to produce an electronically excited gaseous product which decays to a lower electronic state by emitting photons of optical radiation, means for modulating the applied radio frequency energy at a certain frequency to produce a modulation of the emitted optical radiation at a related frequency, and analyzer means for determining the spectral content of said modulated optical radiation.

2. The apparatus of claim 1, wherein said analyzer means includes means for detecting said modulation of the emitted optical radiation at a frequency related to the certain modulation frequency of the applied radio frequency energy.

3. The apparatus of claim 2 including, means for separating and detecting the emitted optical radiation according to wavelength.

4. The apparatus of claim 2 wherein said means for detecting modulation of the emitted optical radiation includes a phase sensitive detector for comparing the phase of the modulation of the radio frequency energy with the phase of the modulation of the detected optical radiation to obtain an output.

5. The method for producing optical radiation comprising the steps of, causing an ensemble of gaseous material having first and second gaseous constituents to be disposed in a magnetic field, ionizing the first gaseous constituent, applying radio frequency energy to the first ionized gaseous constituent at the ion cyclotron resonance frequency thereof in the magnetic field to stimulate a reaction of said first ionized constituent and said second gaseous constituent to produce a gaseous reaction product having an excited electronic energy state which decays by emitting photons of optical radiation, and analyzing said optical radiation to determine the spectral content thereof.

* * * * *